UNITED STATES PATENT OFFICE.

DR. M. PERL, OF HOUSTON, TEXAS.

IMPROVED MODE OF PRESERVING MEAT.

Specification forming part of Letters Patent No. 82,871, dated October 6, 1868.

*To all whom it may concern:*

Be it known that I, Dr. M. PERL, of Houston, in the county of Harris and State of Texas, have invented certain new and useful Improvements in the Mode of Preserving Meat; and I do hereby declare that the following is a full, clear, and exact description thereof, reference being had to the accompanying drawings, and to the letters of reference marked thereon, which form a part of this specification.

My invention relates to a new process for rendering air-tight the covering placed around preserved meat, which will be hereinafter more fully described.

To enable others skilled in the art fully to understand my invention, I will proceed to describe it.

I subject the meat to be preserved to the action of hot sulphurous-acid gas for several minutes, according to the size of the pieces. I then place the meat in a concentrated solution of acetate of soda. This process is repeated several times. The meat is then hung in the open air to dry.

The meat thus preserved is sewed up in a bag, and, in order to render the latter air-tight, I dip it in a compound solution made as follows: I mix together six parts of tar and three parts of linseed-oil, and boil the compound over a slow fire for half an hour, or thereabout. I then add two parts of yellow ocher and one of rock-lime, powdered, and boil about a quarter of an hour longer, stirring all the time. The bag containing the meat is then dipped in the compound solution while hot, and then hung in the air to dry. An air-tight flexible cover for the preserved meat is thus obtained.

Having thus fully described my invention, what I claim as new, and desire to secure by Letters Patent, is—

Covering meat with a flexible material, when said covering is saturated with a compound prepared substantially as herein set forth.

In testimony that I claim the foregoing as my own I affix my signature in presence of two witnesses.

DR. M. PERL.

Witnesses:
 FRANKLIN DENISON,
 JOHN A. HUNTER.